April 26, 1949.    A. G. RICHARDSON ET AL    2,468,109
DIRECTION FINDER
Filed March 19, 1945
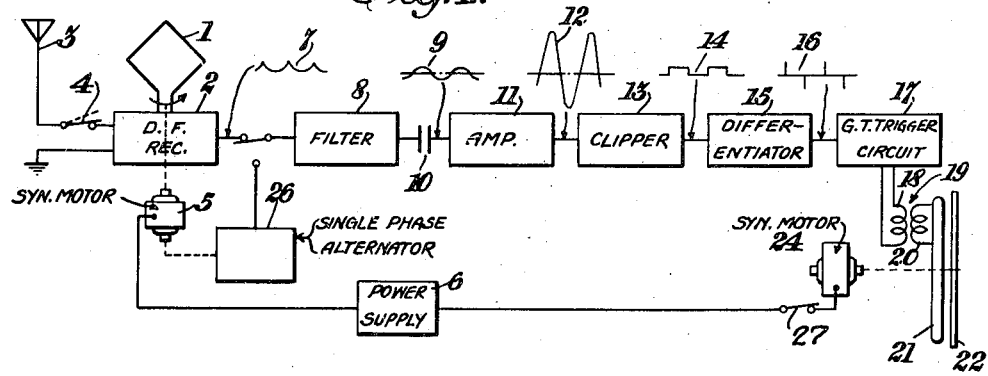
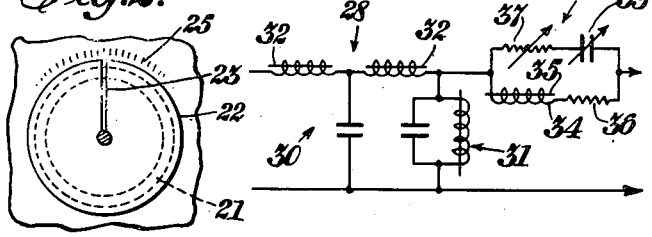
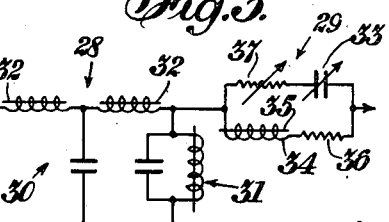
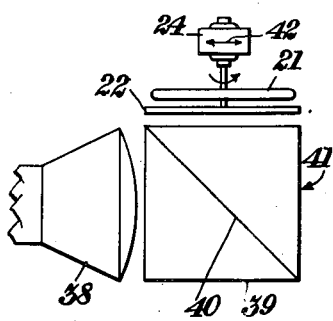
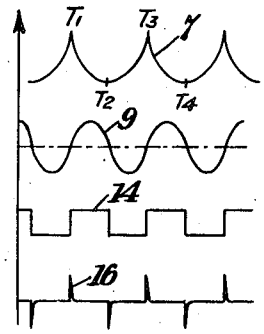
INVENTORS
AVERY G. RICHARDSON
ARBOR G. EVERHART
BY
ATTORNEY Patented Apr. 26, 1949

2,468,109

UNITED STATES PATENT OFFICE 2,468,109

DIRECTION FINDER

Avery G. Richardson, Boonton, N. J., and Arbor G. Everhart, Great River, N. Y., assignors to Federal Telephone and Radio Corporation, New York, N. Y., a corporation of Delaware Application March 19, 1945, Serial No. 583,502

8 Claims. (Cl. 343—118)

The present invention relates to a direction finding system.

In direction finding systems of the type utilizing an illuminated area of an oscilloscope as the direction indicating means, readings are not readily made and require interpretation. The illuminated area is not a fine sharp line but is usually fairly broad, rather oblate, and of blurred definition. In addition, due in large measure to noise and other interferences, the lighted area is frequently considerably distorted and changes in configuration with the interfering transients.

An object of the present invention is the provision of an improved direction finding system giving improved directional indication.

Another object of the present invention is the provision of a direction finding system in which the effects of noise and other interferences on the indication is minimized.

Another object of the present invention is the provision of a direction finding system in which the indications are easily read. A feature of our invention is the provision of an indicating means in a direction finding receiver permitting instant reading and not requiring any interpretation.

Another object of the present invention is the provision of a direction finding system in which the direction is indicated by a pointer consisting of a thin line of light.

A further object of the present invention is the provision of a direction finding system having an indicator which is simpler and more durable than the oscilloscope type and which provides a pointer in the form of a line of light.

Still another object of the present invention is the provision of a testing and aligning arrangement for use with the direction finding system of the type hereinabove indicated.

Other and further objects of the present invention will become apparent and the foregoing will be best understood from the following description of an embodiment thereof, reference being had to the drawing, in which:

Fig. 1 is a block diagram of a direction finding system embodying our invention;

Fig. 2 is a detailed view of the slotted disc through which the line of light indicating direction appears;

Fig. 3 is a schematic diagram of the filter illustrated in Fig. 1;

Fig. 4 is a schematic diagram of an arrangement for comparing the indications obtained in our direction finding system with indications of an oscilloscope which may be part of some other system; and Fig. 5 is a set of curves used in describing our invention.

Referring now to Fig. 1, a directional antenna arrangement, such as a loop 1, is coupled to a direction finding receiver 2 of the null detecting type, that is, a receiver which gives the maximum response when the antenna is receiving the minimum of energy from a given direction. A sensing antenna 3 may also be coupled to the direction finding receiver 2 through a switch 4. To rotate the directional pattern of loop 1 which would be a figure of 8 without the sensing antenna, and a cardioid with the sensing antenna, a synchronous motor 5 may be employed, said synchronous motor 5 being supplied with energy from a power supply 6. The output of the direction finding receiver 2 is a rectified wave 7 corresponding to the directional pattern.

The system as thus far described is conventional and it is to be understood that numerous changes may be made therein as is well-known in the art. For example, an Adcock antenna array with a goniometer might be used in place of the rotating loop.

The wave 7 will also contain various transients representing noise and other forms of interference. In accordance with our invention, this wave 7 is passed through a filter arrangement 8 which is corrected both for normal phase shift and for variations in phase caused by variations in amplitude of the input thereto. The filter arrangement is designed to pass substantially only energy having a frequency equal to the frequency of rotation of loop 1. The details of this are described hereinafter in connection with Fig. 3.

The output wave 9 of the filter is sinusoidal and is fed through a coupling condenser 10 to an amplifier 11, whose output produces a wave 12 corresponding to wave 9 but larger in amplitude. Wave 12 is then passed through a known clipper 13 which clips the peaks thereof and rectifies the waveform to produce a resultant wave 14 of rectangular pulses. Wave 14 is passed through a differentiator 15 to thereby produce sharp pulses 16 corresponding to the leading and trailing edges of the pulses of wave 14. The positive ones of sharp pulses 16 trigger a gas tube type of trigger circuit 17 to thereby energize the primary 18 of a lighting transformer 19 whose secondary 20 is coupled to illuminating means, such as a circular neon tube 21, which may be best seen in outline in Fig. 2. Movable masking means is provided in front of the tube 21 which masking means is provided with a discontinuity and whose motion is synchronized with the rotation of loop 1. The masking means may consist of a disc 22 having an opening or narrow slot 23, the disc being mounted for rotation and driven by a synchronous motor 24 which is energized from the power supply 6 which also energizes synchronous motor 5 and drive loop 1. Synchronous motors 5 and 24 rotate at the same speed and so do loop 1 and disc 22.

The operation of the aforedescribed system will be best understood with reference to Fig. 5. As loop 1 rotates, the output of the direction finding receiver 2 will vary as shown by wave 7. At times $T_1$ and $T_3$ when loop is in such a position as to receive the minimum amount of energy from a given direction, the output of the receiver 2 will be at a peak and at times $T_2$ and $T_4$ when the loop is in a position to receive the maximum energy, the output of the receiver is at a minimum. It will therefore be seen that the instantaneous value of the output of the direction finding receiver 2 will depend upon the instantaneous position of loop 1 and the direction from which energy is being received by said loop. It will also be seen that the beginning of a cycle of wave 9 occurs at time $T_1$, and when this wave is amplified and later clipped to produce wave 14, consisting of rectangular pulses, it will further be seen that the leading edge of each pulse corresponds to a peak of wave 7. When these rectangular pulses are differentiated the positive pulses will thus correspond with peaks of wave 7. As was stated before, these positive short pulses 16 cause tube 21 to be illuminated. Consequently it will be seen that tube 21 is illuminated in fixed time relationship, more specifically in synchronism, with the arrival of peaks at the output of direction finding receiver 2. Since disc 22 is rotated in synchronism with the rotation of loop 1, it will therefore be apparent that the position of the slot at the time tube 21 is flashed, will correspond with the given direction from which energy is being received. To enable instantaneous readings, calibration 25 may be provided surrounding said disc, thus giving immediate directional readings.

Where the power supply is unsteady, as for example, in small power supplies used in airplanes, the synchronous motors 5 and 24 may slip a pole in relation to each other. To test and align for this, the synchronous motor 5 may be used to drive a single phase alternator 26 and the input to the filter may be switched to the output of said single phase alternator. The single phase alternator will deliver at its output a sine wave having the same frequency as the frequency of rotation of loop 1, and the output of said alternator thus serves as a testing means for determining whether the synchronous motors 5 and 24 are in phase. If the motors are in step, a line will be produced as the result of the illumination of tube 21 whose position will line up with a given zero or reference position. If the motors have shifted a pole in relation to each other, motor 24 may be controlled by means of the switch 27 to correct this.

Referring now to Fig. 3, the filter arrangement 8 consists of a filter 28 and a phase correcting network 29. The filter 28 consists of two sections: a constant K section 30 and a derived M section 31. This filter is designed to pass substantially only energy of the frequency of rotation of loop 1. Transient and other undesirable interferences are thus substantially eliminated. The circuit 28 produces a given phase shift. This phase shift is made constant for a given applied frequency and varying amplitude by providing the series inductances or choke coils of the filter with cores 32 of relatively constant permeability. Such cores serve to prevent variation of the phase shift with changes in the amplitude of the signal passing through said choke coils.

In cases where the power supply frequency may vary over a small range, the frequency of the receiver output will vary by the same percentage. This will cause an unwanted phase shift in the usual filter.

To correct for the phase shift introduced by filter 28 in such a case, we provide a phase correcting network 29 consisting of a capacitance 33, a choke coil 34 having a relatively constant permeability core 35 and resistances 36 and 37 arranged as indicated. The correction network is tuned to a frequency differing from the frequency which filter 28 passes, the frequency selected being such as to compensate for the phase shift produced in filter 28. In one given instance, filter 28 was designed to pass 40 cycles and produced a constant phase shift of 60°, which however varied as the 40 cycles was varied. The correction network 29 was tuned to a frequency of 50 cycles and by proper apportioning of the parameters thereof, fully maintained the phase shift at 60°. It will therefore be seen that the filter arrangement 8 not only serves to eliminate transients and other interferences, but does so without causing any change in phase as the input frequency is varied by small amounts.

Referring now to Fig. 4, we have there illustrated an arrangement whereby the indications produced in our system may be compared with indications produced in another system with which it may be associated in use. Referring now to said figure, an indicator such as an oscilloscope 38, which may be part of another system, is arranged at one end of a viewing frame 39 having a diagonally arranged half-silvered mirror 40. The neon tube 21 and disc 22 of our arrangement may be arranged looking downwardly on said frame 39 so that the light escaping through the slit 23 in the disc is projected upon the mirror 40. Looking into the frame from the direction indicated by the arrow 41, the indications produced by the disc 22 and neon tube 21 will appear in line with those produced on the screen of the oscilloscope 38 and may be directly compared. For aligning the indications, the entire motor 24 may be turned as indicated by arrow 42.

While we have described our invention in connection with a specific embodiment thereof, it will be apparent that many details may be changed without departing from the teachings of our invention. For example, while we have shown a specific type of filter, it will be obvious that other filters might be employed in place therof. Other changes will likewise occur to those versed in the art.

Accordingly, while we have described above the principles of our invention in connection with specific apparatus, it is to be clearly understood that this description is made only by way of example and not as a limitation on the scope of our invention as set forth in the objects of our invention and the accompanying claims.

We claim:

1. In a direction finding system comprising a directional antenna arrangement, a direction finding receiver, means coupling said antenna arrangement to said receiver, and means for shifting the directional pattern of said arrangement at a given frequency; an indicating and receiver system comprising a filter passing substantially only energy of said given frequency coupled to the output of said receiver, said filter including an inductance coil having a core of substantially constant permeability whereby the inherent phase shift of the energy passing through said filter is constant with changes in the amplitude of said energy illuminating means, means responsive to the energy at the output of said filter and synchronized with a given phase thereof for flashing said illuminating means, movable masking means arranged in relation to said illuminating means, said masking means having a discontinuity, and means for moving said masking means in synchronism with the directional pattern shifting means.

2. A direction finding system according to claim 1, further comprising means for correcting said phase shift coupled to the output of said filter.

3. A direction finding system according to claim 1 further comprising a circuit detuned from said given frequency for correcting said phase shift.

4. In a direction finding system comprising a directional antenna arrangement, a direction finding receiver, means coupling said antenna arrangement to said receiver, and means for shifting the directional pattern of said arrangement at a given frequency including a first synchronous motor and a power supply for said synchronous motor; a filter passing substantially only energy of said given frequency coupled to the output of said receiver, illuminating means, means responsive to the energy at the output of said filter and synchronized with a given phase thereof for flashing said illuminating means, movable masking means arranged in relation to said illuminating means, said masking means having a discontinuity, means for moving said masking means in synchronism with the directional pattern shifting means including a second synchronous motor connected with said power supply, a single phase alternator driven by said first synchronous motor, and means for switching the input of said filter from said direction finding receiver to the output of said alternator.

5. A direction finding system according to claim 4 wherein said filter produces a phase shift in the energy passing therethrough, and said filter includes an inductance coil having a core of substantially constant permeability whereby the phase shift of the energy passing through said coil is not varied by changes in the amplitude of said energy.

6. A direction finding system according to claim 4 wherein said filter produces a given constant phase shift in the energy passing therethrough, and including means for correcting said phase shift coupled to the output of said filter.

7. A direction finding system according to claim 4 wherein said filter produces a given constant phase shift in the energy passing therethrough, and including means for correcting said phase shift coupled to the output of said filter, said means comprising a circuit detuned from said given frequency.

8. In a system designed to indicate the relative phase of two voltages of the same frequency, where one voltage contains unwanted components of harmonics and noise; a filter for said one voltage designed to eliminate all but the fundamental desired frequency, circuit means associated with said filter to maintain the phase shift of the system at a substantially constant value for small variations in the applied frequency and a phase correcting circuit associated with said circuit means for compensating phase shift produced in said filter due to small variations in frequency of said one voltage.

AVERY G. RICHARDSON.
ARBOR GORDON EVERHART.

REFERENCES CITED

The following references are of record in the file of this patent:

UNITED STATES PATENTS

| Number | Name | Date |
|---|---|---|
| 1,997,111 | Hardy | Apr. 9, 1935 |
| 2,183,746 | Hyland | Dec. 19, 1939 |
| 2,213,273 | Earp | Sept. 3, 1940 |
| 2,334,247 | Busignies | Nov. 16, 1943 |
| 2,379,363 | Lear | June 26, 1945 |

FOREIGN PATENTS

| Number | Country | Date |
|---|---|---|
| 369,202 | Great Britain | Mar. 3, 1932 |